(12) United States Patent
Tsukimori et al.

(10) Patent No.: US 12,444,913 B2
(45) Date of Patent: Oct. 14, 2025

(54) WIRE HARNESS (71) Applicant: SUMITOMO WIRING SYSTEMS, LTD., Yokkaichi (JP)

(72) Inventors: Naoto Tsukimori, Yokkaichi (JP); Ryo Fujioka, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 177 days.

(21) Appl. No.: 18/172,733

(22) Filed: Feb. 22, 2023

(65) Prior Publication Data

US 2023/0291186 A1 Sep. 14, 2023

(30) Foreign Application Priority Data

Mar. 9, 2022 (JP) .................. 2022-036052

(51) Int. Cl.
H02G 3/04 (2006.01)
B60R 16/02 (2006.01)

(52) U.S. Cl.
CPC ....... *H02G 3/0406* (2013.01); *B60R 16/0215* (2013.01); *H02G 3/0481* (2013.01)

(58) Field of Classification Search
CPC .............. B60R 16/0215; H02G 3/0406; H02G 15/1806; H02G 3/0481
See application file for complete search history.

(56) References Cited

U.S. PATENT DOCUMENTS

| 2013/0269981 | A1* | 10/2013 | Shiga | H02G 3/06 174/136 |
| 2015/0287497 | A1* | 10/2015 | Shiga | B60R 16/0215 174/84 R |
| 2018/0041175 | A1* | 2/2018 | Broekaert | H04B 10/6931 |
| 2018/0301242 | A1 | 10/2018 | Sugino | |
| 2019/0140433 | A1* | 5/2019 | Sugino | H02G 3/0481 |
| 2019/0393686 | A1* | 12/2019 | Hiromori | H02G 3/0616 |
| 2020/0062197 | A1* | 2/2020 | Nakaizumi | F16L 5/00 |
| 2022/0285045 | A1* | 9/2022 | Iwama | H01B 7/185 |
| 2023/0106031 | A1* | 4/2023 | Mizutani | H02G 3/0406 174/350 |

FOREIGN PATENT DOCUMENTS

| JP | 2017-084547 A | 5/2017 | |
| WO | WO-2011102005 A1 * | 8/2011 | ......... B60R 16/0215 |

* cited by examiner

*Primary Examiner* — Paresh Paghadal
(74) *Attorney, Agent, or Firm* — Oliff PLC (57) ABSTRACT A wire harness including: an electric wire; a pipe into which the electric wire is inserted; a holder that is fixed to a longitudinal end of the pipe and holds the electric wire; and a heat-shrinkable tube that has heat-shrinkability and is fixed to an outer peripheral surface of the electric wire, wherein the holder includes an engagement that engages with the heat-shrinkable tube to restrict movement of the electric wire in a longitudinal direction relative to the holder.

5 Claims, 6 Drawing Sheets

WIRE HARNESS

BACKGROUND

The present disclosure relates to wire harnesses.

A conventional wire harness includes an electric wire, a pipe that covers the outer periphery of the electric wire, and a holder that is fixed to a longitudinal end of the pipe and holds the electric wire (see, for example, JP 2017-84547A). The holder includes a tubular inner fitting portion fitted into the longitudinal end of the pipe, and a holding piece extending from part of the inner fitting portion in the circumferential direction inside the pipe. The holder holds the electric wire, as a result of adhesive tape being wound around the holding piece together with the electric wire. In such a wire harness, the holder holds the position of the electric wire relative to the end of the pipe, so that, for example, the electric wire is prevented from rubbing against the end of the pipe.

SUMMARY

The foregoing wire harness uses adhesive tape to hold the electric wire by the holder, which requires, for example, tape winding work. Moreover, with the structure that relies on the adhesive power of adhesive tape, the power of holding the electric wire by the holder is weak. Therefore, for example, the electric wire tends to be displaced in its longitudinal direction relative to the holder.

An exemplary aspect of the disclosure provides a wire harness that can hold an electric wire without using adhesive tape.

A wire harness according to the present disclosure is a wire harness including: an electric wire; a pipe into which the electric wire is inserted; a holder that is fixed to a longitudinal end of the pipe and holds the electric wire; and a heat-shrinkable tube that has heat-shrinkability and is fixed to an outer peripheral surface of the electric wire, wherein the holder includes an engagement that engages with the heat-shrinkable tube to restrict movement of the electric wire in a longitudinal direction relative to the holder.

The wire harness according to the present disclosure can hold an electric wire without using adhesive tape.

DETAILED DESCRIPTION OF EMBODIMENTS

Description of Embodiments of the Present Disclosure

First, embodiments of the present disclosure will be listed and described below.

1. A wire harness according to the present disclosure is a wire harness including: an electric wire; a pipe into which the electric wire is inserted; a holder that is fixed to a longitudinal end of the pipe and holds the electric wire; and a heat-shrinkable tube that has heat-shrinkability and is fixed to an outer peripheral surface of the electric wire, wherein the holder includes an engaging portion that engages with the heat-shrinkable tube to restrict movement of the electric wire in a longitudinal direction relative to the holder.

With this structure, the holder includes the engaging portion that engages with the heat-shrinkable tube fixed to the outer peripheral surface of the electric wire to restrict the movement of the electric wire in the longitudinal direction relative to the holder. Accordingly, the movement of the electric wire in the longitudinal direction is restricted without using adhesive tape. This, for example, makes tape winding work unnecessary. In addition, displacement of the electric wire in the longitudinal direction relative to the holder can be suppressed as compared with a structure that relies on the adhesive power of adhesive tape.

2. Preferably, the electric wire is formed by connecting a first electric wire and a second electric wire extending in the longitudinal direction of the electric wire, the first electric wire includes a first core wire and a first insulating coating covering an outer periphery of the first core wire, the second electric wire includes a second core wire and a second insulating coating covering an outer periphery of the second core wire, the electric wire includes a joint joining the first core wire and the second core wire, and the heat-shrinkable tube covers the first insulating coating and the second insulating coating while covering the joint.

With this structure, the heat-shrinkable tube covers the first insulating coating and the second insulating coating while covering the joint, so that, for example, the joint is prevented from being exposed to water. Since the heat-shrinkable tube has two functions, the number of parts can be reduced as compared with, for example, the case where a member that engages with the engaging portion of the holder and a member that prevents the joint from being exposed to water are provided separately.

3. Preferably, the engaging portion is one of a pair of engaging portions spaced apart in a longitudinal direction of the holder, and the pair of engaging portions are engageable with both longitudinal end faces of the heat-shrinkable tube.

With this structure, the pair of engaging portions spaced apart in the longitudinal direction of the holder are engageable with both longitudinal end faces of the heat-shrinkable tube. Therefore, the movement of the electric wire in the longitudinal direction can be favorably restricted.

4. Preferably, the heat-shrinkable tube has a recess in a part corresponding to the joint, and the engaging portion is fitted into the recess to be engageable with both longitudinal end faces in the recess.

With this structure, the engaging portion is fitted into the recess in the part corresponding to the joint and is engageable with both longitudinal end faces in the recess. Therefore, the movement of the electric wire in the longitudinal direction can be favorably restricted.

5. Preferably, a depth of the recess is greater than a thickness of the heat-shrinkable tube as a result of an end of the first core wire and an end of the second core wire at the joint being flattened.

With this structure, the depth of the recess is greater than the thickness of the heat-shrinkable tube, and accordingly the area of engagement between the heat-shrinkable tube and the engaging portion can be increased to tightly engage the engaging portion with the heat-shrinkable tube. The movement of the electric wire in the longitudinal direction can thus be restricted more tightly.

6. Preferably, the engaging portion further restricts movement of the electric wire in a direction crossing the longitudinal direction relative to the holder.

With this structure, the engaging portion further restricts the movement of the electric wire in the direction crossing the longitudinal direction relative to the holder. Thus, the movement of the electric wire in the direction crossing the longitudinal direction is also restricted without using adhesive tape.

7. Preferably, the electric wire is one of two electric wires, the engaging portion is one of a pair of engaging portions facing each other in a radial direction of the holder, and the pair of engaging portions are configured to sandwich the two electric wires in a direction in which the two electric wires are arranged.

With this structure, the pair of engaging portions facing each other in the radial direction of the holder are configured to sandwich the two electric wires in the direction in which the two electric wires are arranged. The two electric wires can thus be held favorably.

Details of Embodiments of the Present Disclosure

Specific examples of the wire harness according to the present disclosure will be described below, with reference to the drawings. In each drawing, part of the structure may be exaggerated or simplified for convenience of explanation. In addition, the dimensional ratio of each part may be different among the drawings. The present disclosure is not limited to these examples, but is defined by the claims and intended to include all modifications within the meaning and scope equivalent to the claims. The terms "parallel" and "orthogonal" as used herein respectively include not only being exactly parallel and exactly orthogonal but also being substantially parallel and substantially orthogonal within the range in which the functions and effects according to the embodiment are achieved. The terms "circular" and "arc-shaped" as used herein respectively include not only being exactly circular and exactly arc-shaped but also being substantially circular and substantially arc-shaped within the range in which the functions and effects according to the embodiment are achieved.

Overall Structure of Wire Harness 10

Figure 1:
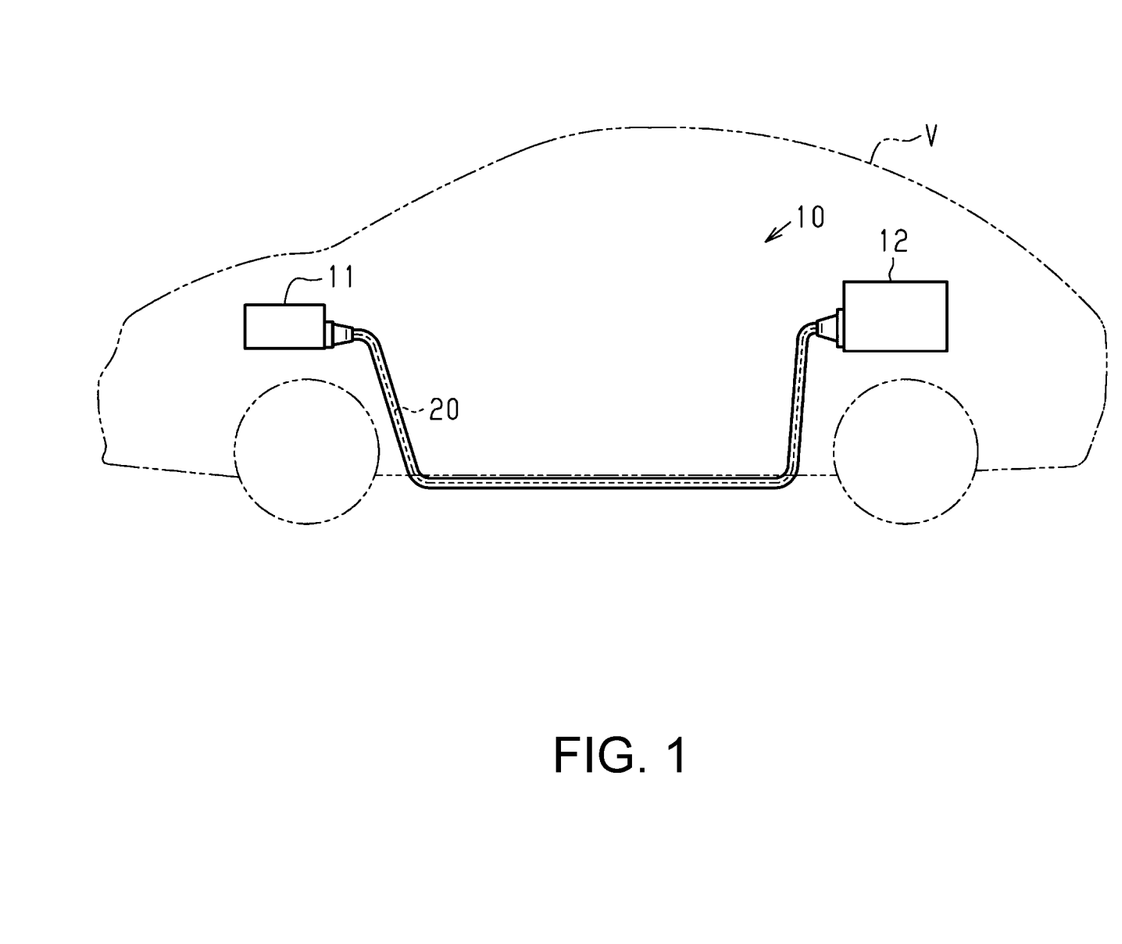
FIG. 1 is a schematic view showing a wire harness according to an embodiment.

A wire harness 10 shown in FIG. 1 electrically connects two or three or more electric devices. For example, the wire harness 10 electrically connects an inverter 11 installed at the front of a vehicle V such as a hybrid vehicle or an electric vehicle and a high-voltage battery 12 installed behind the inverter 11 in the vehicle V. The wire harness 10 is, for example, routed so as to pass under the floor of the vehicle V. For example, the wire harness 10 is routed so that an intermediate portion of the wire harness 10 in the longitudinal direction will pass outside the vehicle interior such as under the floor of the vehicle V.

The inverter 11 is connected to a wheel drive motor (not shown) that is a power source for vehicle running. The inverter 11 generates AC power from DC power of the high-voltage battery 12, and supplies the AC power to the motor. The high-voltage battery 12 is, for example, a battery capable of supplying a voltage of several hundred volts.

Figure 2:
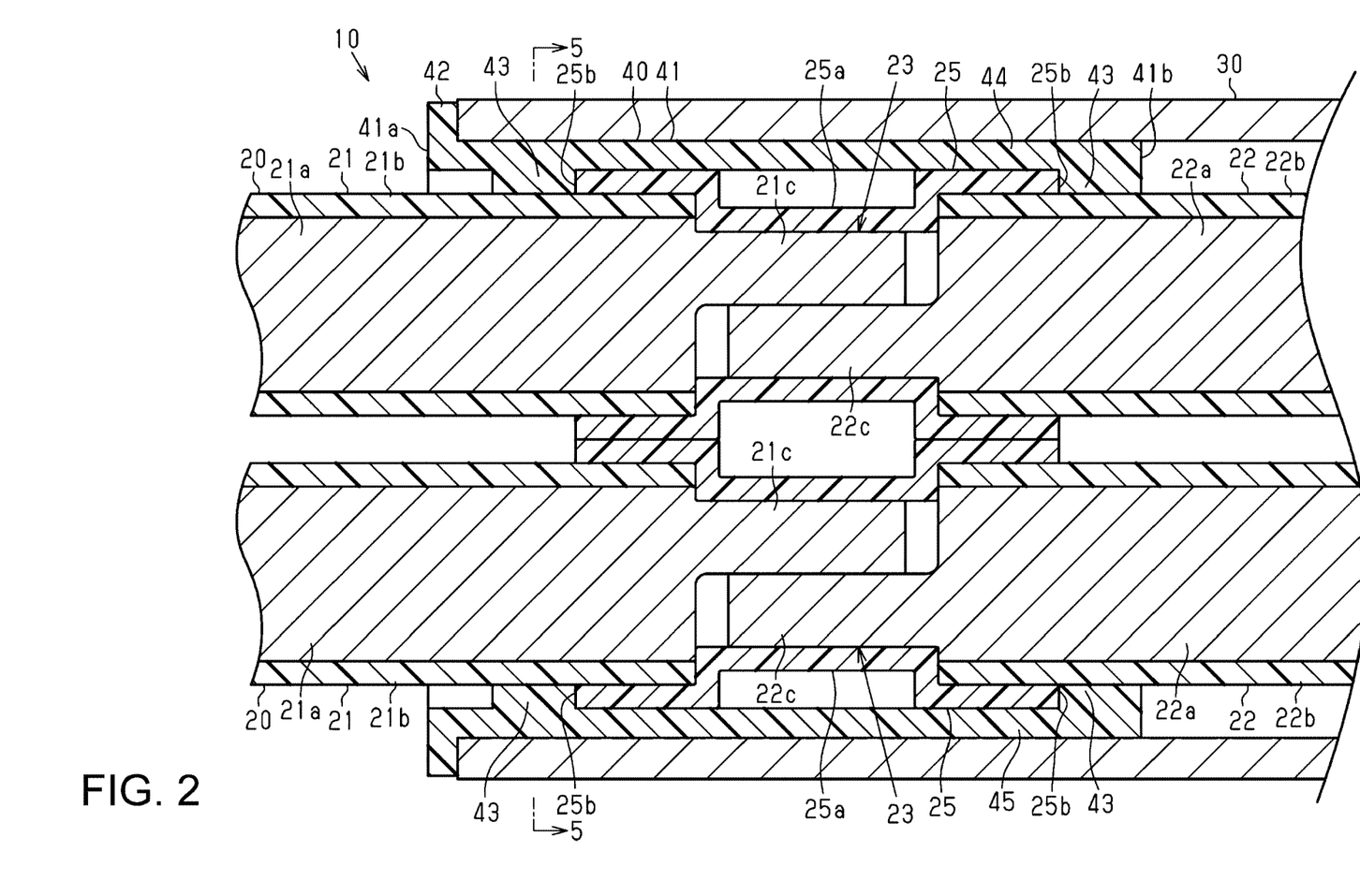
FIG. 2 is a partial sectional view of the wire harness according to the embodiment.

As shown in FIG. 2, the wire harness 10 includes electric wires 20 that electrically connect the electric devices, a heat-shrinkable tube 25 fixed to the outer peripheral surface of each of the electric wires 20, a pipe 30 into which the electric wires 20 are inserted, and a holder 40 attached to a longitudinal end of the pipe 30.

Structure of Electric Wire 20

The wire harness 10 includes two electric wires 20. Each electric wire 20 is formed by connecting a first electric wire 21 and a second electric wire 22 extending in the longitudinal direction of the electric wire 20. The first electric wire 21 includes a first core wire 21a and a first insulating coating 21b covering the outer periphery of the first core wire 21a. The second electric wire 22 includes a second core wire 22a and a second insulating coating 22b covering the outer periphery of the second core wire 22a.

As each of the first core wire 21a and the second core wire 22a, for example, a stranded wire formed by twisting a plurality of metal strands or a braided member formed by knitting a plurality of metal strands into a tubular shape may be used. In this embodiment, the first core wire 21a and the second core wire 22a are stranded wires. As the material of the first core wire 21a and the second core wire 22a, for example, a metal material such as copper-based or aluminum-based may be used. The first core wire 21a and the second core wire 22a which are stranded wires are schematically shown in FIG. 2, etc.

The first insulating coating 21b and the second insulating coating 22b are made of, for example, an insulating material such as synthetic resin.

The electric wire 20 also includes a joint 23 joining the first core wire 21a and the second core wire 22a. Specifically, a longitudinal end 21c of the first core wire 21a is exposed as a result of the first insulating coating 21b being removed. This end 21c of the first core wire 21a is flattened as a result of being crushed. A longitudinal end 22c of the second core wire 22a is exposed as a result of the second insulating coating 22b being removed. This end 22c of the second core wire 22a is flattened as a result of being crushed. The end 21c of the first core wire 21a and the end 22c of the second core wire 22a are overlapped and joined to form the joint 23.

Structure of Heat Shrinkable Tube 25

The heat-shrinkable tube 25 has heat-shrinkability, i.e., shrinks when heated. The heat-shrinkable tube 25 is shaped as a cylinder through which the electric wire 20 can be passed, before heating. When the heat-shrinkable tube 25 is heated in a state in which the electric wire 20 is passed through the heat-shrinkable tube 25, the heat-shrinkable tube 25 heat-shrinks and consequently deforms so as to cover the outer periphery of the electric wire while being in close contact with the outer peripheral surface of the electric wire 20. That is, the heat-shrinkable tube 25 heat-shrinks and consequently deforms so as to cover the first insulating coating 21b and the second insulating coating 22b while covering the joint 23. In other words, the heat-shrinkable tube 25 is provided across the end of the first insulating coating 21b and the end of the second insulating coating 22b so as to cover the joint 23 therebetween. In this embodiment, the heat-shrinkable tube 25 has a recess 25a in the part corresponding to the joint 23. The recess 25a is recessed from other portions by being formed as a result of the first insulating coating 21b and the second insulating coating 22b not being provided at the joint 23 and the end 21c of the first core wire 21a and the end 22c of the second core wire 22a being flattened.

Structure of Pipe 30

The pipe 30 is shaped as a long tube. In this embodiment, the pipe 30 has a perfect cylindrical shape. The pipe 30 contains, for example, an intermediate part of each electric wire 20 in the longitudinal direction. For example, the pipe 30 covers the whole outer periphery of the electric wires 20 in the circumferential direction. As the pipe 30, for example, a metal pipe or a resin pipe may be used. As the material of the metal pipe, for example, a metal material such as aluminum-based or copper-based may be used. As the material of the resin pipe, for example, a synthetic resin such as polyolefin, polyamide, polyester, or ABS resin may be used. In this embodiment, the pipe 30 is a metal pipe.

For example, the pipe 30 is bent two-dimensionally or three-dimensionally in parts extending upward from under the floor of the vehicle V. The pipe 30 is bent, for example, in a state in which the electric wires 20 are inserted into the straight pipe 30.

Figure 3:
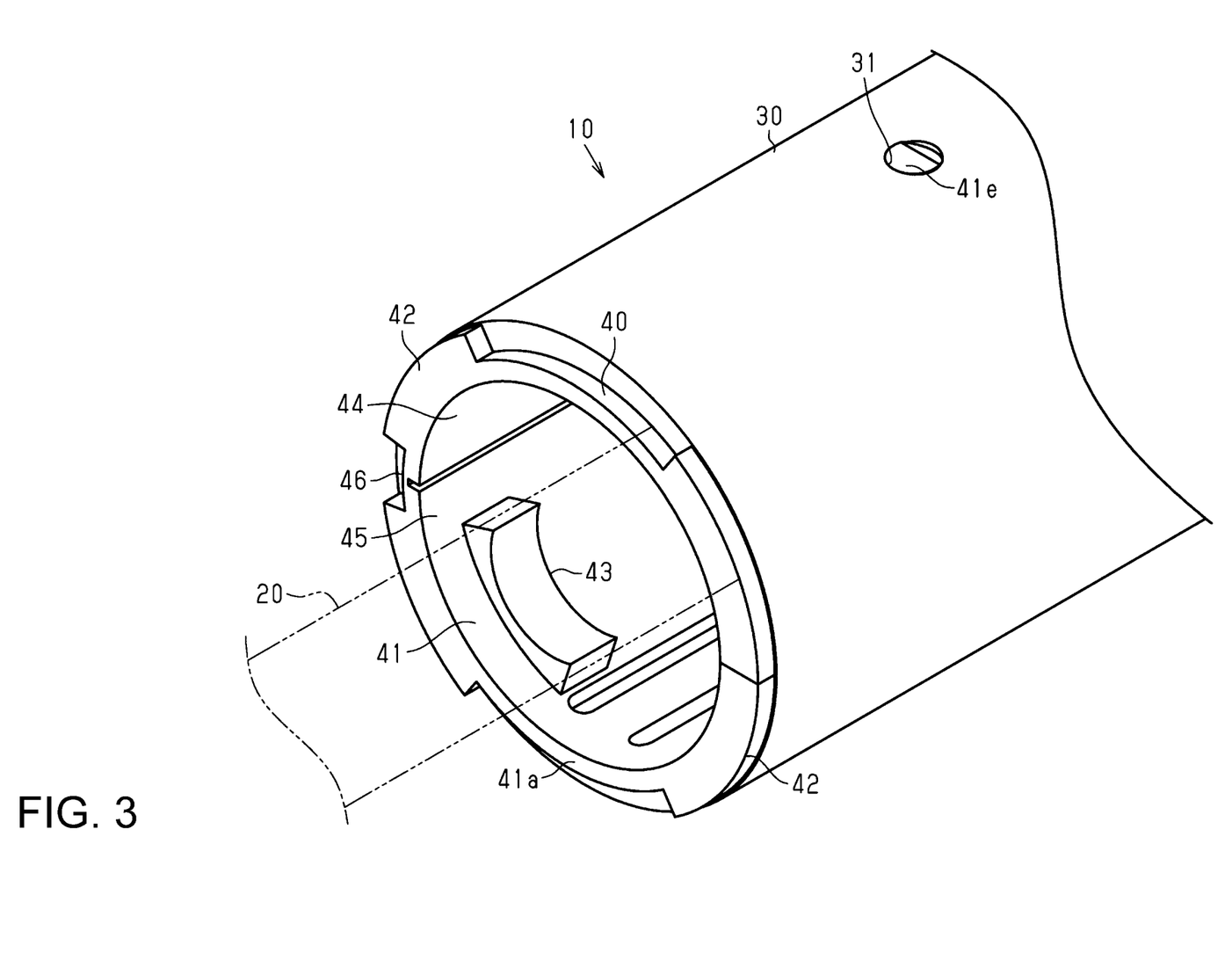
FIG. 3 is a partial perspective view of the wire harness according to the embodiment.
Figure 4:
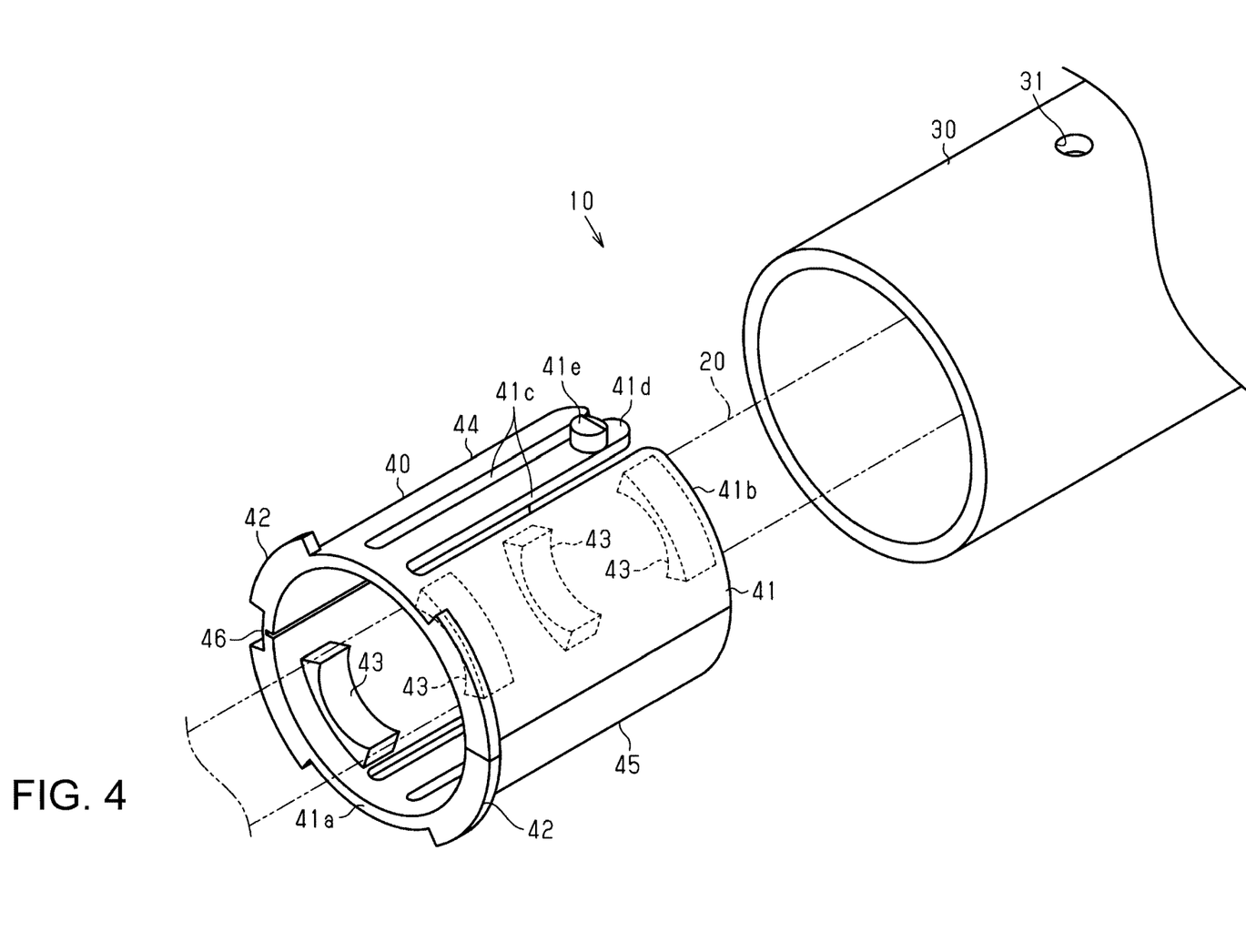
FIG. 4 is a partially exploded perspective view of the wire harness according to the embodiment.

As shown in FIGS. 3 and 4, circular through-holes 31 are formed on the outer peripheral surface of the pipe 30. The through-holes 31 are located near a longitudinal end of the pipe 30. Two through-holes 31 are arranged at different positions in the circumferential direction of the pipe 30. The through-holes 31 are arranged at equal intervals in the circumferential direction of the pipe 30.

Structure of Holder 40

Figure 5:
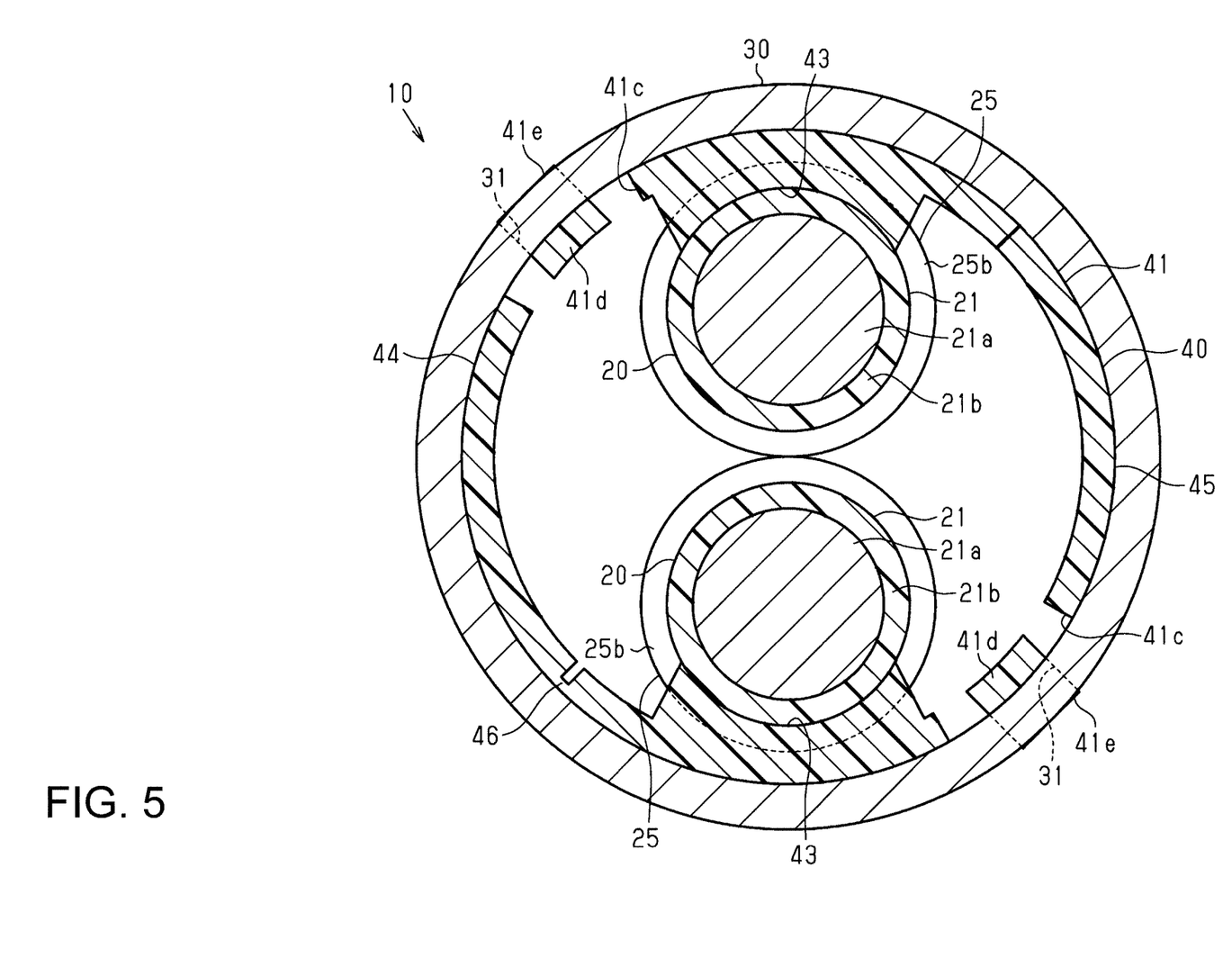
FIG. 5 is a sectional view taken along line 5-5 in FIG. 2.

The holder 40 includes a tubular portion 41, a flange portion 42, and engaging portions 43 (engagements), as shown in FIGS. 2 and 4. The tubular portion 41 is fitted into the longitudinal end of the pipe 30. The outer peripheral surface of the tubular portion 41 faces the inner peripheral surface of the pipe 30. The flange portion 42 is located at a longitudinal first end 41a of the tubular portion 41. The flange portion 42 projects radially outward from the tubular portion 41. The flange portion 42 is provided in part of the tubular portion 41 in the circumferential direction. The flange portion 42 is in contact with the longitudinal end face of the pipe 30 in a state in which the tubular portion 41 is fitted into the pipe 30. As shown in FIGS. 4 and 5, the holder 40 is composed of a first structural portion 44, a second structural portion 45, and a thin hinge portion 46. The first structural portion 44 and the second structural portion 45 are formed by dividing the tubular portion 41 and the flange portion 42 in the circumferential direction. The first structural portion 44 and the second structural portion 45 are connected at their circumferential ends by the thin hinge portion 46. That is, the holder 40 can be brought into an open state by relatively rotating the first structural portion 44 and the second structural portion 45 about the hinge portion 46. As a result of the holder 40 being changed from the open state to the closed state, the holder is attached to the electric wires 20 so as to externally cover the electric wires 20. The holder 40 is made of resin.

As shown in FIG. 4, the tubular portion 41 has slits 41c extending from the second end 41b toward the first end 41a of the tubular portion 41 in the longitudinal direction. The tubular portion 41 has a flexible piece 41d in the part sandwiched between the pair of slits 41c. The flexible piece 41d is bendable in the radial direction of the tubular portion 41 with the part opposite to the second end 41b as the base end. As shown in FIG. 5, two flexible pieces 41d are arranged at different positions in the circumferential direction of the tubular portion 41. The flexible pieces 41d are arranged at equal intervals in the circumferential direction of the tubular portion 41. The respective flexible pieces 41d are located at the circumferential center of the first structural portion 44 and the circumferential center of the second structural portion 45.

Each flexible piece 41d has a fixing protrusion 41e. The fixing protrusion 41e protrudes radially outward from the tubular portion 41. As shown in FIGS. 4 and 5, the fixing protrusion 41e is fitted into the through-hole 31 in a state in which the tubular portion 41 is fitted into the pipe 30, thereby preventing the tubular portion 41 from coming off the pipe 30. The holder 40 is thus fixed to the pipe 30.

As shown in FIGS. 2 and 5, the engaging portions 43 project radially inward from the tubular portion 41. The engaging portions 43 engage with the heat-shrinkable tube 25 to restrict the movement of the electric wires 20 in the longitudinal direction relative to the holder 40. Specifically, as shown in FIG. 2, a pair of engaging portions 43 are spaced apart in the longitudinal direction of the holder 40. In other words, two engaging portion 43 are arranged at different positions in the longitudinal direction of the holder 40. The pair of engaging portions 43 spaced apart in the longitudinal direction of the holder 40 are engageable with both longitudinal end faces 25b of the heat-shrinkable tube 25. In other words, the pair of engaging portions 43 spaced apart in the longitudinal direction of the holder are arranged so that the heat-shrinkable tube 25 will be situated between the engaging portions 43. The engaging portions 43 thus restrict the movement of the heat-shrinkable tube 25 and the electric wires 20 in the longitudinal direction relative to the holder 40.

As shown in FIG. 5, the engaging portions 43 are each located in part of the tubular portion 41 in the circumferential direction. The engaging portion 43 is located between the circumferential end and the flexible piece 41d in each of the first structural portion 44 and the second structural portion 45. A pair of engaging portions 43 face each other in the radial direction of the tubular portion 41. The tip of each engaging portion 43 is arc-shaped along the outer peripheral surface of the electric wire 20. Accordingly, the engaging portions 43 are configured to further restrict the movement of the electric wires 20 in a direction crossing the longitudinal direction relative to the holder 40. That is, the pair of engaging portions 43 facing each other in the radial direction of the holder 40 are configured to sandwich the two electric wires 20 in the direction in which the two electric wires 20 are arranged, and engage with the outer peripheral surfaces of the electric wires 20 to restrict the movement of the electric wires 20 in the direction crossing the longitudinal direction.

As shown in FIG. 2, two engaging portions 43 are arranged at different positions in the longitudinal direction of the electric wires 20 on the inner peripheral surface of the first structural portion 44. Likewise, two engaging portions 43 are arranged at different positions in the longitudinal direction of the electric wires 20 on the inner peripheral surface of the second structural portion 45. That is, two engaging portions 43 are arranged in each of the first structural portion 44 and the second structural portion 45 in this embodiment.

The functions according to this embodiment will be described below.

Each electric wire 20 is held by the engaging portion 43 in the holder 40. The holder 40 is fixed to the longitudinal end of the pipe 30 by the fixing protrusion 41e fitted into the through-hole 31. In this way, for example even in the case where a force acts on the electric wire 20 when bending the pipe 30, the electric wire 20 is kept from being displaced in the longitudinal direction relative to the end of the pipe 30. Moreover, for example, the electric wire 20 is prevented from rubbing against the end of the pipe 30.

The effects according to this embodiment will be described below.

1. The holder 40 includes the engaging portion 43 that engages with the heat-shrinkable tube 25 fixed to the outer peripheral surface of the electric wire 20 to restrict the movement of the electric wire 20 in the longitudinal direction relative to the holder 40. Accordingly, the movement of the electric wire 20 in the longitudinal direction is restricted without using adhesive tape. This, for example, makes tape winding work unnecessary. In addition, displacement of the electric wire 20 in the longitudinal direction relative to the holder 40 can be suppressed as compared with a structure that relies on the adhesive power of adhesive tape.

2. The heat-shrinkable tube 25 covers the first insulating coating 21b and the second insulating coating 22b while covering the joint 23, so that, for example, the joint 23 is prevented from being exposed to water. Since the heat-shrinkable tube 25 has two functions, the number of parts can be reduced as compared with, for example, the case where a member that engages with the engaging portion 43 of the holder 40 and a member that prevents the joint 23 from being exposed to water are provided separately.

3. The pair of engaging portions 43 spaced apart in the longitudinal direction of the holder 40 are engageable with both longitudinal end faces 25b of the heat-shrinkable tube 25. Therefore, the movement of the electric wire 20 in the longitudinal direction can be favorably restricted.

4. The engaging portion 43 further restricts the movement of the electric wire 20 in the direction crossing the longitudinal direction relative to the holder 40. Thus, the movement of the electric wire 20 in the direction crossing the longitudinal direction is also restricted without using adhesive tape.

5. The pair of engaging portions 43 facing each other in the radial direction of the holder 40 are configured to sandwich the two electric wires 20 in the direction in which the two electric wires 20 are arranged. The two electric wires 20 can thus be held favorably.

The following modifications can be made to the foregoing embodiment. The foregoing embodiment and the modifications described below may be combined unless they are technically inconsistent.

Although the foregoing embodiment describes the case where the engaging portions 43 are engageable with both longitudinal end faces 25b of the heat shrinkable tube 25, the engaging portions 43 may be configured to engage with other parts of the heat-shrinkable tube 25 as long as the movement of the electric wires 20 in the longitudinal direction relative to the holder 40 can be restricted.

Figure 6:
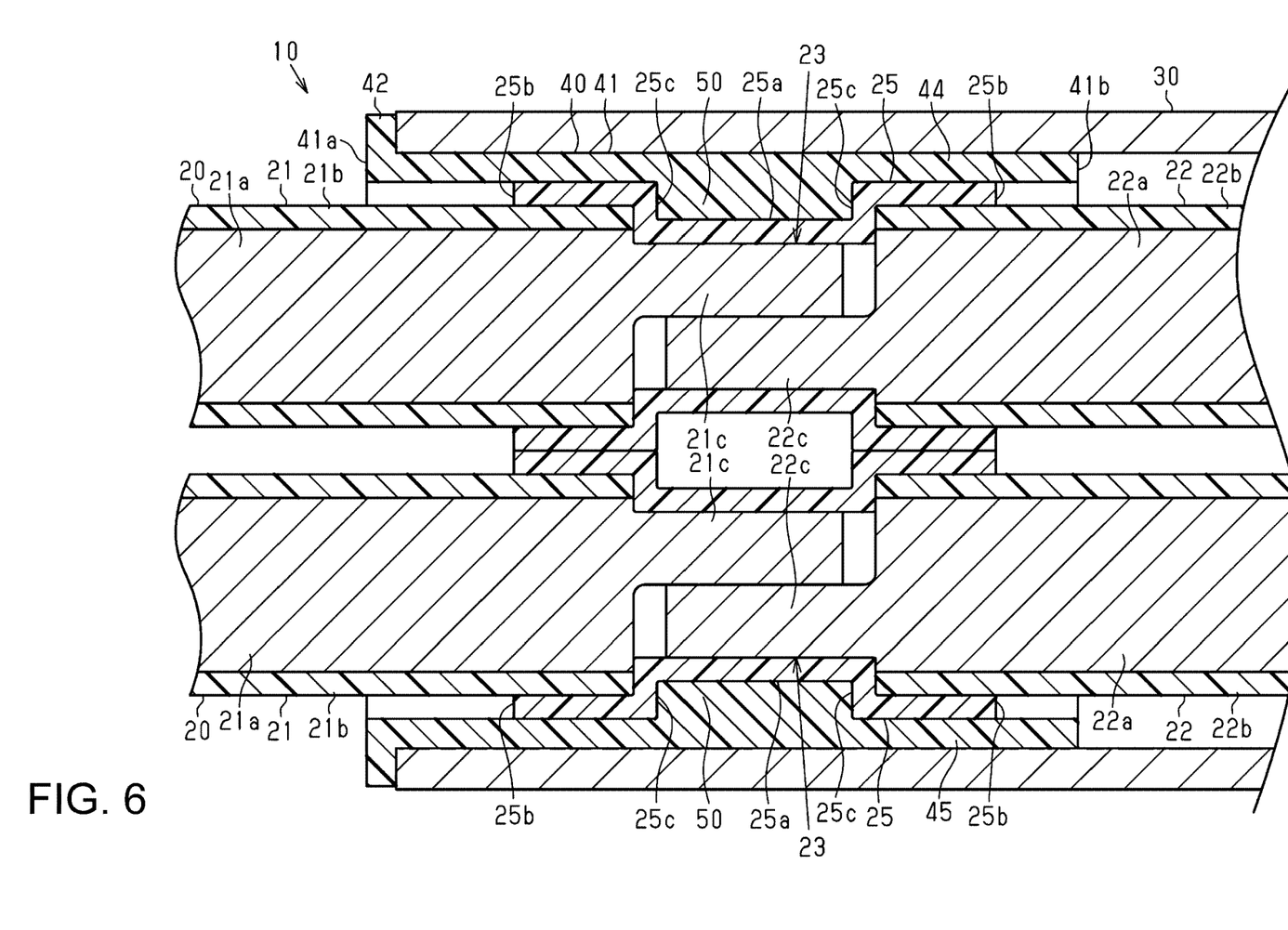
FIG. 6 is a partial sectional view of a wire harness according to another example.

An example of this modification is shown in FIG. 6. Each engaging portion 50 in this example is fitted into the recess 25a of the heat-shrinkable tube 25 to be engageable with both longitudinal end faces 25c in the recess 25a. Such engaging portions 50, too, can favorably restrict the movement of the heat-shrinkable tube 25 and the electric wires 20 in the longitudinal direction. In this example, as a result of the end 21c of the first core wire 21a and the end 22c of the second core wire 22a at the joint 23 being flattened, the depth of the recess 25a is greater than the thickness of the heat shrinkable tube 25. Therefore, for example, the area of engagement between the heat shrinkable tube 25 and each engaging portion 50 can be increased as compared with the foregoing embodiment, thus ensuring the engagement of the engaging portion 50 with the heat shrinkable tube 25. Consequently, the movement of the electric wires 20 in the longitudinal direction can be restricted more reliably.

Although the foregoing embodiment describes the case where the heat-shrinkable tube 25 covers the first insulating coating 21b and the second insulating coating 22b while covering the joint 23, the present disclosure is not limited to such, and the heat-shrinkable tube 25 may not cover the joint 23 and the like. For example, the electric wire 20 may not include the joint 23.

Although the foregoing embodiment describes the case where the tip of the engaging portion 43 is arc-shaped along the outer peripheral surface of the electric wire 20 to further restrict the movement of the electric wire 20 in the direction crossing the longitudinal direction relative to the holder 40, the present disclosure is not limited to such. For example, the engaging portion 43 may be provided on the entire circumference of the tubular portion 41 and have its tip arc-shaped along the inner peripheral surface of the tubular portion 41.

Although the foregoing embodiment describes the case where the holder 40 has a pair of engaging portions 43 facing each other in the radial direction of the holder 40 and the pair of engaging portions 43 are configured to sandwich the two electric wires 20 in the direction in which the two electric wires 20 are arranged, the present disclosure is not limited to such. For example, the pair of engaging portions 43 may not face each other in the radial direction of the tubular portion 41 of the holder 40. For example, the engaging portions 43 may be provided to sandwich each electric wire 20 individually.

Although the foregoing embodiment describes the case where the wire harness 10 includes two electric wires 20, the present disclosure is not limited to such. The wire harness 10 may include one electric wire 20 or three or more electric wires 20. The number of engaging portions 43 arranged in the circumferential direction of the holder 40 may be changed, too.

Although the foregoing embodiment describes the case where the pipe 30 has a perfect cylindrical shape, the present disclosure is not limited to such. For example, the pipe may have a square tubular shape, an elliptical shape, or the like. The shape of the tubular portion 41 of the holder 40 may be changed according to the shape of the pipe 30.

Although the foregoing embodiment describes the case where the holder 40 is composed of the first structural portion 44, the second structural portion 45, and the thin hinge portion 46, the present disclosure is not limited to such. For example, the holder 40 may be composed of the first structural portion and the second structural portion not connected by the hinge portion 46.

Although the foregoing embodiment describes the case where two through-holes 31 and two fixing protrusions 41e are provided, the present disclosure is not limited to such. For example, the number of through-holes 31 and the number of fixing protrusions 41e may be one, or three or more.

Although the foregoing embodiment describes the case where the wire harness 10 electrically connects the inverter 11 and the high-voltage battery 12, the present disclosure is not limited to such. The wire harness 10 may electrically connect other electric devices.

What is claimed is:

1. A wire harness comprising:
a first electric wire assembly;
a second electric wire assembly;
a pipe into which the first and second electric wire assemblies are inserted;
a holder that is fixed to a longitudinal end of the pipe, holds the first and second electric wire assemblies, and is inserted into the pipe such that an outer circumferential surface of the holder faces an inner circumferential surface of the pipe; and a heat-shrinkable tube that has heat-shrinkability and is fixed to an outer peripheral surface of each of the first and second electric wire assemblies, wherein the holder includes at least a pair of engagements that engage with the heat-shrinkable tube of each of the first and second electric wire assemblies to restrict movement of the first and second electric wire assemblies in a longitudinal direction relative to the holder inside the pipe, wherein the first electric wire assembly is formed by connecting a first electric wire and a second electric wire extending in the longitudinal direction of the first electric wire assembly, and the second electric wire assembly is formed by connecting a third electric wire and a fourth electric wire extending in the longitudinal direction, the first electric wire includes a first core wire and a first insulating coating covering an outer periphery of the first core wire, the second electric wire includes a second core wire and a second insulating coating covering an outer periphery of the second core wire, the third electric wire includes a third core wire and a third insulating coating covering an outer periphery of the third core wire, the fourth electric wire includes a fourth core wire and a fourth insulating coating covering an outer periphery of the fourth core wire, the first electric wire assembly includes a first joint joining the first core wire and the second core wire, and the second electric wire assembly includes a second joint joining the third core wire and the fourth core wire, the heat-shrinkable tube of the first electric wire assembly covers the first insulating coating and the second insulating coating while covering the first joint, and the heat-shrinkable tube of the second electric wire assembly covers the third insulating coating and the fourth insulating coating while covering the second joint, the heat-shrinkable tube of the first electric wire assembly has a first recess in a part corresponding to the first joint, and the heat-shrinkable tube of the second electric wire assembly has a second recess in a part corresponding to the second joint, and the pair of engagements are respectively fitted into the first and second recesses to be engageable with both longitudinal end faces in each of the first and second recesses.

2. The wire harness according to claim 1, wherein the pair of engagements are spaced apart in the longitudinal direction of the holder, and the pair of engagements are engageable with both longitudinal end faces of the heat-shrinkable tube of the first and second electric wire assemblies.

3. The wire harness according to claim 1, wherein a depth of the first recess is greater than a thickness of the heat-shrinkable tube of the first electric wire assembly as a result of an end of the first core wire and an end of the second core wire at the first joint being flattened.

4. The wire harness according to claim 1, wherein the pair of engagements further restrict movement of the first and second electric wire assemblies in a direction crossing the longitudinal direction relative to the holder.

5. The wire harness according to claim 1, the pair of engagements face each other in a radial direction of the holder, and the pair of engagements are configured to sandwich the first and second electric wire assemblies in a direction in which the first and second electric wire assemblies are arranged.

* * * * *